United States Patent [19]

Heyn et al.

[11] 4,342,192

[45] Aug. 3, 1982

[54] PLANT FOR PRODUCING POWER FROM SOLID FOSSIL FUELS, MORE PARTICULARLY BITUMINOUS COAL

[75] Inventors: Klaus Heyn; Hans-Joachim Pogrzeba, both of Essen, Fed. Rep. of Germany

[73] Assignee: Steag A.G., Essen, Fed. Rep. of Germany

[21] Appl. No.: 94,564

[22] Filed: Nov. 15, 1979

[30] Foreign Application Priority Data

Nov. 17, 1978 [DE] Fed. Rep. of Germany ....... 2850005
Aug. 2, 1979 [DE] Fed. Rep. of Germany ....... 2931427

[51] Int. Cl.$^3$ ............................................. F02C 6/18
[52] U.S. Cl. ............................... 60/39.18 B; 60/39.52
[58] Field of Search ............. 60/39.12, 39.18 B, 39.41, 60/39.52; 122/4 D

[56] References Cited

U.S. PATENT DOCUMENTS

| | | | |
|---|---|---|---|
| 3,002,347 | 10/1961 | Sprague | 60/39.12 |
| 3,234,735 | 2/1966 | Pirsh et al. | 60/39.18 R |
| 3,804,606 | 4/1974 | Archer et al. | 60/39.12 |
| 3,866,411 | 2/1975 | Marion et al. | 60/39.52 |
| 3,990,229 | 11/1976 | Staege | 60/39.12 |

*Primary Examiner*—Lous J. Casaregola
*Attorney, Agent, or Firm*—Andrus, Sceales, Starke & Sawall

[57] ABSTRACT

A plant for producing power from solid fossil fuels, more particularly bituminous coal, is made up of at least one boiler in which the solid fuels are burned. The plant furthermore has a steam turbine and a gas turbine for producing power from the gas, the gases being cleaned of dust and sulfur before running into the gas turbine. The boiler of the plant is a pressure-fired boiler in which firing takes place in the dry condition, that is without melting of ash.

16 Claims, 2 Drawing Figures

PLANT FOR PRODUCING POWER FROM SOLID FOSSIL FUELS, MORE PARTICULARLY BITUMINOUS COAL

BACKGROUND OF THE INVENTION

1. Field of the Invention

The invention relates to a plant for producing power from solid fossil fuels, more particularly bituminous coal, made up of at least one boiler, in which the solid fuels are burned, the plant furthermore having a steam turbine and a gas turbine for producing power from the gas, the gases being cleaned of dust and sulfur in the plant before going into the gas turbine.

2. The Prior Art

In an earlier suggestion for such a plant (see the German Offenlegungsschrift No. 2,650,491), a fuel after grinding is fed to a boiler with a pressure firing system. The stack gases from the boiler are cleaned of dust and undesired, damaging substances, and furthermore undergo desulfurizing before being used in the gas turbine. The teaching of this earlier suggestion is that of designing a plant of this sort such that losses and troublesome conditions on operation are decreased. A further purpose was that of designing such a plant that it may be used in peak load power stations. The losses take the form of unburned material in the ash and the heat losses in the quenching water, while troublesome conditions on operation are caused, more particularly, by the tar-dust mix produced.

It will be seen that with the teaching of this earlier suggestion the part-burning or part-combustion and the later-stage burning take place in a single part of the plant, so that only one operation has to be automatically controlled. The operation may be so controlled as is necessary for a peak load power station; that is to say the power may be increased at a generally high rate, and decreased again to be in line with the power output of the plant without this being responsible for heat losses or its being necessary to make use of oil or further, other fuels in addition for supporting the burning process. Because burning of the fuel takes place in a boiler, the forming of tar is stopped and special parts of such plant, so far necessary in other designs, are not needed and troublesome conditions may be put to an end. On the stack gas side the pressure in the boiler is of the order of 10 bar, this generally being in line with the pressure relation or ratio of the turbine.

The main purposes effected by such a plant is that the amount of unburned material in the boiler ash becomes unimportant. The thermal efficiency is very much greater, because losses caused by evaporation of quenching water outside the steam circuit are generally put to an end, such losses having been so far necessarily produced in the case of gasification of the fuel. Because, furthermore, the fuel is burned in an apparatus itself under pressure, it is possible to do without a number of further units, used in past gasification systems, that is to say, more specially, a gas producer, while the system is better than a fluidized bed system because a very much smaller unit is needed for the burning process.

BRIEF DESCRIPTION OF THE INVENTION

One purpose of the present invention is that of making such a further development of this plant that burning takes place under the slag melting temperature.

A further purpose of the invention is that of making possible a very much smaller size of the plant.

A still further purpose of the present invention is that of increasing the thermal efficiency so as to be greater than past designs of plants working at atmospheric pressure.

For effecting these and other purposes the plant of the invention has a boiler in the form of a pressure-fired boiler with dry firing. For decreasing the fire space temperature so as to be under the ash melting temperature, use is best made of a stack gas or flue gas recycling system working under pressure.

In this respect a part of the stack gas, clear of dust and so far not heated up again, is run back into the burning space or chamber so that the desired decrease in the firing space temperature is produced, while at the same time making for a smaller size of the burning space in comparison with past designs of dry firing systems. The dividing up of the gas currents or flows takes place at a point downstream from the boiler.

More specifically, in a further development of the present invention, a part-current of the stack gases, at a point downstream from the boiler, is run into a waste heat boiler. An amount, as generally necessary for stack gas recycling, goes into this waste heat boiler, in which the gases are cooled down to about 130° C. and then go into a dust cleaning unit which is common to the main and recycle currents or flows.

The purpose of the waste heat boiler is:
1. that of cooling down the amount of gas (greater than about 15% of the overall amount of gas) necessary for stack gas recycling, from a high temperature level and in this respect producing high pressure steam; and
2. controlling the amount of heat offered to the gas turbine.

The use of a waste heat boiler is very much more useful than a system in which the complete gas current is caused to go through the gas-to-gas heat exchanger and then nextly through the trimming cooler, this being so because:
1. the taking of heat for the amount of gas, to be used for recycling, takes place at a high temperature level in the waste heat boiler for producing high pressure steam, and not at a low temperature level in the trimming cooler for the first stage of heating of boiler input or feed water. This is responsible for better conditions in the steam cycle, that is the overall thermal efficiency is increased.
2. Because of the high temperature level in the waste heat boiler in comparison with a trimming cooler, while having the same heat throughput, very much smaller heating faces are necessary.
3. In the waste heat boilers amounts of heat may be guided through the system in different ways as desired by using an automatic control valve flap downstream from the waste heat boiler, this making possible the best possible conditions in the steam-gas turbine side of the system in the separate load stages. After the clearing of dust from the gas, the amount of recycle gas is run through a pressure increasing compressor back into the burning space or chamber.

After desulfurizing the main gas current or flow is run back into the main pressure increasing compressor, in which respect, for increasing the thermal efficiency the gas pressure, necessary for the gas turbine, is best produced in two compressors, the output temperature at the air compressor being about 200° C. higher than the stack gas input temperature to the pressure increasing compressor.

The relation between the mass of the stack gas amount upstream from the gas turbine to the amount of sucked in air is about 1:107. If the gas cleaning takes place at a high temperature level, the gas-to-gas heat exchanger and the waste heat boiler will not be needed, the recycling of the stack gas taking place downstream from the waste heat exchanger.

BRIEF DESCRIPTION OF THE DRAWINGS

Further measures and useful effects of the present invention will be clear from the account now to be given of two working examples to be seen in the figures.

DETAILED DESCRIPTION OF THE PREFERRED EMBODIMENTS

Figure 1:
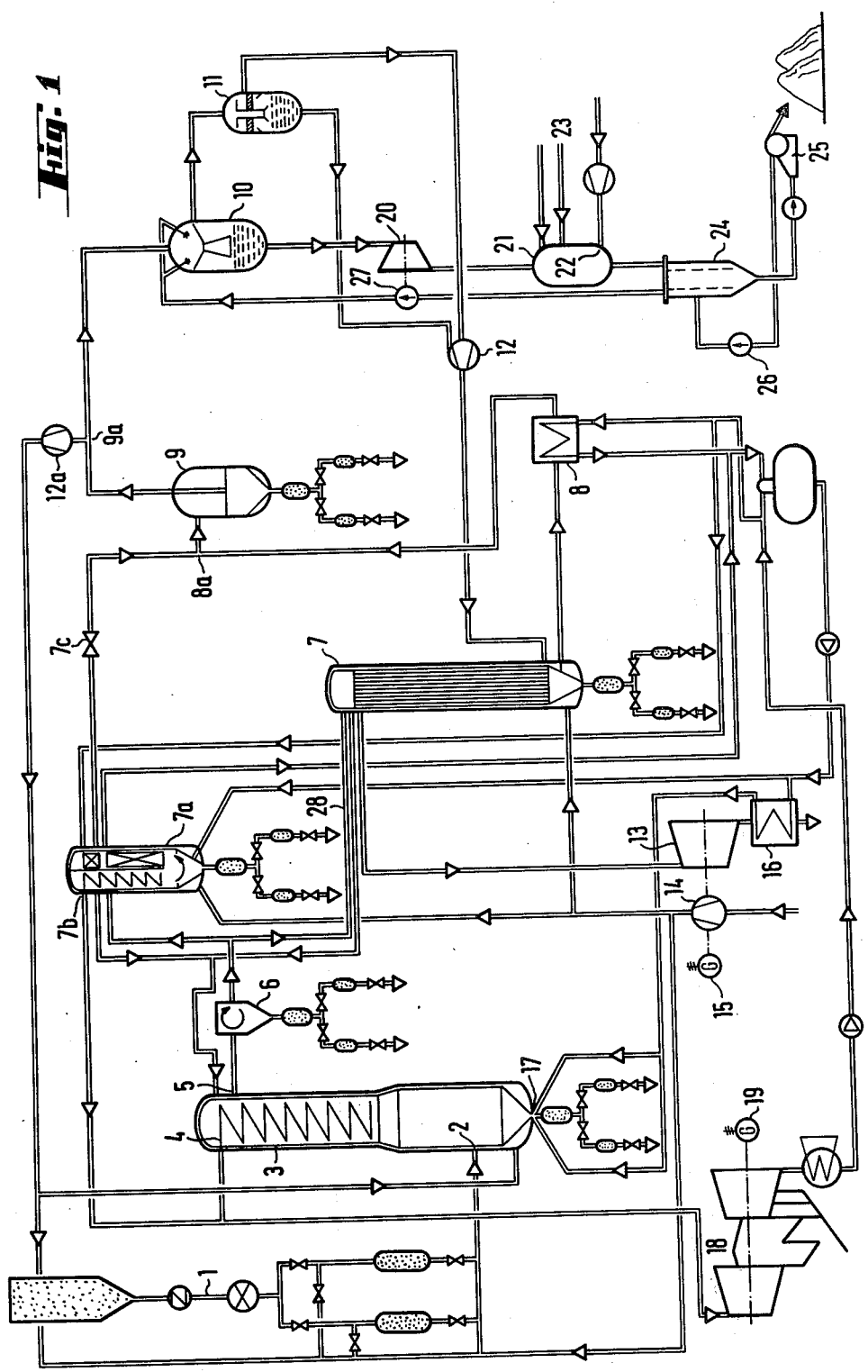
FIG. 1 is a view of a first embodiment of the invention with a pressure increasing compressor placed downstream from the gas cleaning unit, from which a part of the cleaned amount of gas goes back into the firing space.

After grinding coal is run through a pipe 1 under pressure into a dry firing system 2 of a boiler, generally numbered 3.

The coal is burned under pressure, water for the steam cycle being evaporated. The steam is superheated at 4. The stack or flue gases come out at 5 and are cleaned of dust in part in a cyclone 6. Then the gas current undergoes division, that is the main current goes to a gas-to-gas heat exchanger 7, in which the uncleaned stack gases are cooled down, for example to about 300° C. by the cold, cleaned stack gases.

The further, second current or flow, which in level is generally equal to the recycle current in rate or amount, is run into a waste heat boiler 7a, in which the water for the steam cycle is evaporated and superheated at 7b. In this respect the gas is cooled down to about 130° C. The automatic control of the second current is undertaken by an automatic control valve flap 7c placed downstream from the waste heat boiler.

The main gas flow, after going through the gas-to-gas heat exchanger, is run into a trimming cooler 8, where the stack gases are cooled down to about 130° C. At 8a the main and second currents are united and go to a unit 9 for cleaning them of even the finest dust, for example in the form of an electrostatic filter or a filter made up of fabric pipes. The stack gas, cleaned of dust, undergoes division at 9a.

The main current goes to a wet disulfurizing unit 10, where it is washed with a clear alkaline washing liquid or solution for the washing out, in addition to HCl, chlorine, HF, fluorine and $NO_x$, or more particularly $SO_2$.

The useful effect of such a washing system working under pressure in comparison with a unit working at atmospheric pressure is that:

(a) the unit is very much smaller in size and
(b) the form of the reactions in the washing step is very much better, because there is a decrease in the number of molecules with the reaction.

The second current (the recycling current) is run back by way of a pressure increasing compressor 12a to the boiler and is used for automatic control of the temperature of the firing space. The main gas current, after being desulfurized, is run into a mist clearing unit 11, in which the gas is freed of washing liquid mist having undesired materials in it.

The cleaned gases go to a main pressure increasing compressor 12, which, at the same time, is used as a unit for clearing of the last parts of any mist still present.

The stack gas after being cleaned and freed of mist is now run into the gas-to-gas heat exchanger and is heated up to, for example, 800° to 900° C. by the uncleaned stack gas, this being the gas turbine temperature.

The gas turbine 13 is used for driving an air compressor 14 and a generator 15. The compressor 14 is responsible for compressing the burning or combustion air necessary for burning the coal under pressure. The generator 15 is used for producing electrical power.

Downstream from the gas turbine the stack gas, with a temperature of greater than 400° C. for example, goes into the waste heat exchanger 16 where it is responsible for the first stage of heating up of a part of the boiler input water, necessary for the steam producing process, and, itself, is cooled down to, for example, 120° C.

The boiler input water, after this first stage of heating, goes at 17 into the pressure-fired boiler with a dry firing system, in which it is evaporated, and then it is superheated at 4 and, together with the superheated steam 7b coming from the waste heat boiler 7a, goes to a steam turbine 18, driving a generator 17 which, as well, is responsible for producing electrical power.

The ash produced in the parts 3, 6, 7, 7a and 9 of the plant is taken out by way of ash boxes with airlocks. The washing liquid coming from the parts 10 and 11 of the plant and having undesired material in it, goes by way of a relaxation turbine 20 to the oxidizing unit 21.

In this unit, by the blowing in of air at 22 and the input of calcium bisulfite at 23, calcium sulfate is formed by the reactions:

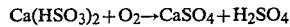

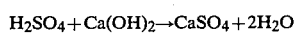

In the desulfurizing unit the main reactions are:

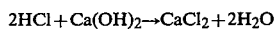

(molecule ratio 5/3)

From the oxidizing unit the calcium sulfate-water mix goes into a gravity separating unit 24, in whose settlement vessel the calcium sulfate crystals precipitate and are pumped from the lower end of the vessel into a drum vacuum filter 25, the calcium sulfate-water mix having 60 to 80% of water. In the filter all but about 20% of the water is filtered off, that is to say the amount of water in the calcium sulfate at the end of filtering is about 20%.

The water coming from the drum vacuum filter goes by way of a pump 26 to the settlement container of the gravity separating unit 24. At the top part of the settlement vessel recycling of the washing liquid or water is undertaken by way of the pump 27, which is powered, in part, by the relaxation turbine 20, the liquid then going to the pressure desulfurizing unit 10.

For clearing $NO_x$ from the uncleaned stack gas in the temperature range of 900° to 1100° C. between the coarse dust clearing unit 6 and the gas-to-gas heat exchanger 7 ammonia is let in at atmospheric pressure in the presence of oxygen.

Figure 2:
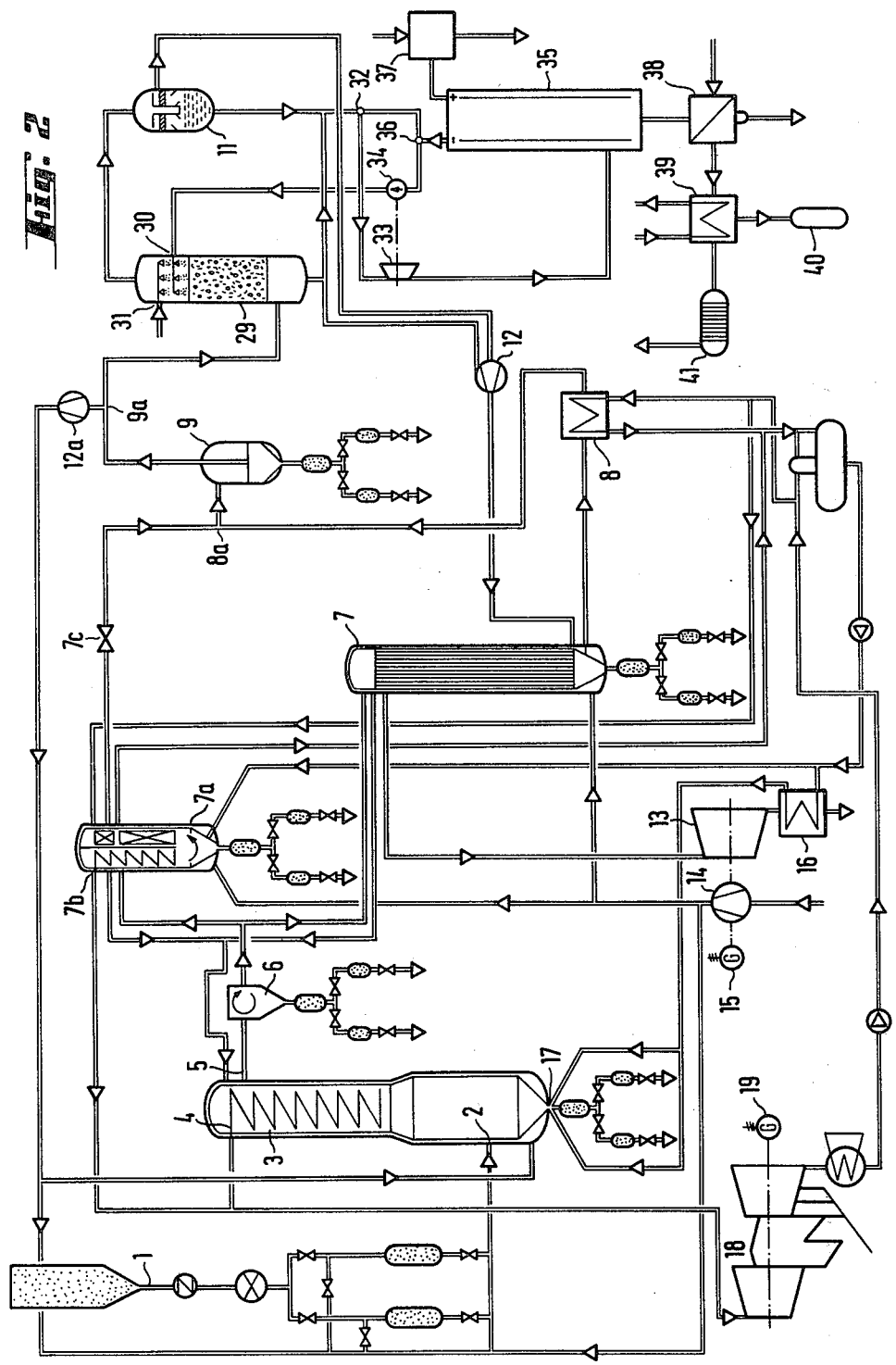
FIG. 2 is a view of a further embodiment of the invention with some changes.

In the system of FIG. 2 the part numbers are used for the same parts as in FIG. 1. Because the only way the system is different to that of FIG. 1 is with respect to the clearing of undesired substances from the system, it is only this part which will now be given a detailed account.

The stack gas coming from the unit 9 for clearing the finest dust, goes from this position into a wet desulfurizing unit 29 working under pressure, where it is processed with watered-down sulfuric acid at 30, the sulfuric acid being mixed with iron sulfate.

In this respect the main reactions are absorption 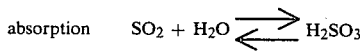 (a)

oxidation 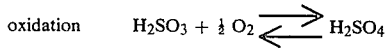 (b)

oxidation 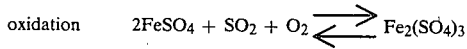 (c)

by catalyst 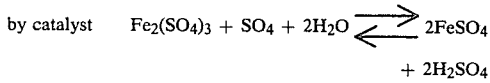

All reactions take place better under pressure, but for the last one in which the number of molecules is the same before and after the reaction, that is to say a reaction in which pressure is unimportant.

For washing out the undesired, damaging materials and for causing the reactions to take place, softened washing water is run into the system at 31.

The stack gas coming from the washing tower and to a very high degree cleared of damaging substances ($SO_2$, $SO_3$, HCl, chlorine, HF, fluorine and $NO_x$) goes from this position into the mist separating unit 11, in which it is freed of mist.

The further processing and use of the stack gas will be seen from the account given in connection with FIG. 1.

The washing liquid coming from the system at 31 and 11, with the undesired substances ($H_2SO_4$, $H(NO)SO_4$, $Fe(NO)SO_4$, $FeSO_4$ $FeCl_2$, $H_2O$), undergoes division at 32. Part of the amount of washing liquid goes by way of a relaxation turbine 33, which, for its part, is used for driving a circulation pump 34, to an electrolytic unit 35. The main part of the flow of the washing liquid goes by way of jets at 30 back into the wet desulfurizing unit 29.

The dirty washing liquid, that is to say washing liquid with undesired substances, is freed of Fe catalyst in the electrolytic unit, the Fe catalyst precipitating as Fe metal, which in the part 36 of the system goes by way of a dissolving unit back into the washing cycle. At the same time, at the anode, an equivalent amount of chlorine is produced, which is taken up in water 37 as hypochlorite.

The excess acid, freed of Fe after electrolytic processing, goes into an evaporator 38 heated by steam, in which the acid is heated up to a temperature of about 130° C. and condensed to about 70% sulfuric acid by the evaporation of water, HCl, HF and NO, which go into a cooler 39.

In the cooler condensing from these gases takes place in the form of hydrochloric acid with a low amount of HF, the acid being run into a takeup vessel 40.

The rest of the NO, together with the rest of the water vapor is run into a carbon bed 41 and changed into $N_2$ and $CO_2$.

The embodiments of the invention in which an exclusive property or privilege is claimed are:

1. A plant for producing power from solid fossil fuels comprising:
   a pressure fired boiler receiving said fuel and burning same, the combustion of the fuel producing steam in said boiler and flue gases discharged therefrom into a flue gas path;
   a steam turbine coupled to said boiler for generating power from the steam;
   flue gas cleaning means in said flue gas path downstream of said boiler for at least partially cleaning the flue gases;
   flue gas cooling means in said flue gas path downstream of said boiler for cooling said flue gases;
   a flue gas recycling system connected to said flue gas path downstream of said cooling means for returning a portion of the flue gases to the boiler for reducing the boiler firing temperature to below the ash melting temperature to obtain drying firing in said boiler; and
   gas turbine means coupled to said flue gas path for receiving said flue gases for generating power from the gases;
   said flue gas cooling means including a gas path parallel to said flue gas path and connected thereto downstream of said pressure-fired boiler and upstream of said recycling system, said parallel gas path containing a waste heat boiler, said parallel gas path removing a portion of the flue gases from said flue gas path and returning same to said flue gas path after passage through said waste heat boiler, said waste heat boiler being coupled to said steam turbine for providing steam thereto.

2. The plant according to claim 1 wherein said flue gas recycling system further includes compressor means for increasing the pressure of the portion of the gases returned to the boiler.

3. The plant according to claim 1 wherein said flue gas cooling means is further defined as removing an amount of flue gas in said parallel gas path established in accordance with the portion said the flue gas returned to said pressure fired boiler.

4. The plant according to claim 1 wherein said flue gas cooling means includes control valve means in said parallel gas path for controlling the amount of flue gas removed from said flue gas path.

5. The plant according to claim 1 including means in said flue gas path downstream of said recycling system and upstream of said gas turbine for reheating the flue gases supplied to said gas turbine.

6. The plant according to claim 5 wherein said flue gas reheating means comprises a gas-to-gas heat exchanger in said flue gas cooling means interposed in said flue gas path such that the gases supplied to said gas turbine are reheated by gases from said pressurized boiler.

7. The plant according to claim 1 including means in said flue gas path downstream of said recycling system and upstream of said gas turbine for reheating the flue gases supplied to said turbine, said reheating means being so interposed in said flue gas path that the flue gases supplied to said gas turbine are reheated by the portion of the flue gases not removed in said parallel gas path.

8. The plant according to claim 1 wherein said flue gas cleaning means is located in said flue gas path upstream of said recycling system.

9. The plant according to claim 1 wherein said flue gas cleaning means is located in said flue gas path upstream of said parallel gas path.

10. The plant according to claim 1 wherein said flue gas cleaning means is located in said flue gas path downstream of said parallel gas path.

11. The plant according to claim 1 wherein said flue gas cleaning means includes a pair of cleaning units, one of which is located upstream of said parallel gas path, the other of which is located downstream from said parallel gas path.

12. The plant according to claim 1 wherein said plant includes gas desulfurizing means and wherein said flue gas recycling system is connected in said flue gas path upstream of said desulfurizing means.

13. The plant according to claim 12 wherein said desulfurizing means is further defined as pressurized desulfurizing means.

14. The plant according to claim 1 including compressor means in said flue gas path connected upstream of said gas turbine for pressurizing said flue gases supplied to said gas turbine.

15. The plant according to claim 14 wherein said compressor means is further defined as multi-stage compressor means.

16. The plant according to claim 1 including means for pulverizing the solid fossil fuel for supply to said boiler.

* * * * *